(12) United States Patent
Caspers et al.

(10) Patent No.: US 12,270,951 B2
(45) Date of Patent: Apr. 8, 2025

(54) TRANSMITTING DEVICE FOR EMITTING LIGHT

(71) Applicant: Robert Bosch GmbH, Stuttgart (DE)

(72) Inventors: Jan Niklas Caspers, Stuttgart (DE); Oliver Kern, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1204 days.

(21) Appl. No.: 16/961,099

(22) PCT Filed: Jan. 15, 2019

(86) PCT No.: PCT/EP2019/050854
§ 371 (c)(1),
(2) Date: Jul. 9, 2020

(87) PCT Pub. No.: WO2019/141641
PCT Pub. Date: Jul. 25, 2019

(65) Prior Publication Data
US 2021/0063548 A1    Mar. 4, 2021

(30) Foreign Application Priority Data
Jan. 16, 2018   (DE) .......................... 102018200620.2

(51) Int. Cl.
*G01S 7/4911*   (2020.01)
*G01S 7/4912*   (2020.01)
*G01S 17/32*    (2020.01)

(52) U.S. Cl.
CPC ........... *G01S 7/4911* (2013.01); *G01S 7/4912* (2013.01); *G01S 17/32* (2013.01)

(58) Field of Classification Search
None
See application file for complete search history.

(56) References Cited

U.S. PATENT DOCUMENTS

| 5,294,075 A | 3/1994 | Vertatschitsch et al. |
| 9,684,076 B1 * | 6/2017 | Feldkhun ............... G01S 17/89 |
| 2001/0013929 A1 | 8/2001 | Torsten |
| 2009/0087186 A1 * | 4/2009 | Holman ............... H04B 10/508 398/102 |

(Continued)

FOREIGN PATENT DOCUMENTS

| CN | 1272233 A | 11/2000 |
| CN | 101802644 A | 8/2010 |

(Continued)

OTHER PUBLICATIONS

International Search Report for PCT/EP2019/050854, Issued Apr. 5, 2019.

(Continued)

*Primary Examiner* — Luke D Ratcliffe
(74) *Attorney, Agent, or Firm* — NORTON ROSE FULBRIGHT US LLP; Gerard A. Messina

(57) ABSTRACT

A transmitting device for emitting light having at least one frequency, the transmitting device being designed to emit light in different angular ranges in such a way that the frequency of the light in the particular angular range is varied in a respective frequency range dependent on time, frequencies in different frequency ranges not overlapping for different angular ranges at different times.

15 Claims, 5 Drawing Sheets

(56) References Cited

U.S. PATENT DOCUMENTS

| | | | |
|---|---|---|---|
| 2014/0111808 A1 | 4/2014 | Nikodem et al. | |
| 2016/0109565 A1* | 4/2016 | Hyun et al. | |
| 2017/0223437 A1* | 8/2017 | Lee | H04J 14/0212 |
| 2017/0328988 A1* | 11/2017 | Magee | G01S 7/484 |
| 2021/0026015 A1* | 1/2021 | Davydenko | G01S 7/4817 |

FOREIGN PATENT DOCUMENTS

| | | |
|---|---|---|
| CN | 102356332 A | 2/2012 |
| CN | 105425245 A | 3/2016 |
| CN | 105814451 A | 7/2016 |
| DE | 4013702 A1 | 10/1991 |
| DE | 4129580 A1 | 3/1993 |
| EP | 2177931 A2 | 4/2010 |
| JP | S63309880 A | 12/1988 |
| JP | H0630477 B2 | 4/1994 |
| JP | 2003273806 A | 9/2003 |
| JP | 2012502301 A | 1/2012 |
| JP | 2015135386 A | 7/2015 |
| WO | 2015120903 A1 | 8/2015 |
| WO | 2016128284 A1 | 8/2016 |

OTHER PUBLICATIONS

Wu, et al.: "A coherent range and range-rate detecgtion radar with large ranging dynamic range and high-repetition-rate (I) : Mechanism and performance," Waves, 33(6), (2014), pp. 1-20.

* cited by examiner

TRANSMITTING DEVICE FOR EMITTING LIGHT

FIELD

The present invention relates to a transmitting device for emitting light having at least one frequency.

The present invention also relates to a receiving device for receiving light.

The present invention moreover relates to a sensor device, to a method for emitting light having at least one frequency, and to a method for receiving light having different frequency ranges.

Even though the present invention is applicable to arbitrary transmitting devices and receiving devices, the present invention is described herein in connection with light detection and ranging systems, LIDAR.

BACKGROUND INFORMATION

Conventional LIDAR systems use narrowband laser beams, which are deflected in a certain direction. When the laser beam strikes an object, its distance may be determined based on the reflection of the laser beam at the object at this angle. For this purpose, for example, a linear frequency ramp is emitted, based on the frequency modulated continuous wave (FMCW) principle, and the difference frequency between the transmitting ramp and the receiving ramp is ascertained with the aid of a coherent reception. Based on this difference frequency, the distance of the object may then be determined. To be able to detect an object in an area, an area may be two-dimensionally illuminated. A short measuring time is required for this, which usually, however, reduces the range, i.e., the distance within which an object may be detected. The cause of this is that, with increasing distance, the signal-to-noise ratio for a certain distance is linearly dependent on the measuring time, and with increasing measuring time, a measurement is then no longer possible.

Furthermore, it is conventional to use multiple sensors to be able to detect a certain angular range, each sensor being assigned a separate angular section of the angular range. However, a dedicated transmitting and receiving path is required in the process for each section. In addition, multiple reflections may arise from other angular sections.

SUMMARY

In one specific example embodiment, the present invention provides a transmitting device for emitting light having at least one frequency, the transmitting device being designed to emit light in different angular ranges in such a way that the frequency of the light in the particular angular range is varied in a respective frequency range dependent on time, frequencies in different frequency ranges not overlapping for different angular ranges at different times.

In one further specific example embodiment, the present invention provides a receiving device for receiving light, a separating unit for separating frequencies of different frequency ranges varying over time and at least one detector for converting the received light into electrical signals being provided.

In one further specific example embodiment, the present invention provides a sensor device including a transmitting device, and a receiving device.

In one further specific example embodiment, the present invention provides a method for emitting light having at least one frequency, the light being emitted in different angular ranges in such a way that the frequency of the light in the particular angular range is varied in a respective frequency range dependent on time, frequencies in different frequency ranges not overlapping for different angular ranges at different times.

In one further specific example embodiment, the present invention provides a method for receiving light having different frequency ranges, in particular, emitted using an example method in accordance with the present invention, frequencies of different frequency ranges varying over time being separated, and, in particular, the received light being converted into electrical signals.

In other words, the light may be emitted in different angular ranges with the aid of the transmitting device, and the reflected light may also be received again with the aid of a receiving unit.

One of the advantages is that multiple angular ranges may be irradiated simultaneously, without requiring multiple transmitters and/or multiple receivers, i.e., multiple transmitting and receiving paths. Another advantage is that, as a result, the measuring time for varying the particular frequency range may also be increased and, as a result, the signal-to-noise ratio may be improved, which ultimately increases the range for the detection of objects with the aid of the sensor device. Another advantage is that, as a result, the flexibility is increased since, for example, multiple horizontal planes may be illuminated simultaneously.

Further features, advantages and further specific embodiments of the present invention are described hereafter or become apparent thereby.

According to one advantageous refinement of the present invention, the transmitting device is designed to linearly vary the frequency in the particular angular range over time, preferably to increase it from a starting frequency to an ending frequency. One of the advantages achieved thereby is that an easy variation of the frequency over time across the entire frequency range is made possible. Moreover, a later evaluation is also simplified since an unambiguous temporal assignment of the frequencies is made possible.

According to one further advantageous refinement of the present invention, a light source and a modulation unit for generating the variation of frequencies of the light of the light source dependent on time are provided. With the aid of a modulation unit, a simple and simultaneously reliable modulation of the light of a light source, for example of a laser, is possible.

According to one further advantageous refinement of the present invention, the modulation unit includes one modulator for each of the different frequency ranges. This enables a particularly reliable modulation.

According to one further advantageous refinement of the present invention, the modulation unit includes a modulator for varying a frequency range over time, and at least one further modulator for generating different frequency ranges. One of the advantages achieved thereby is that a particularly reliable variation of frequencies in different frequency ranges may be provided as a result of the separation of frequency ranges and their respective variation over time. For example, a frequency offset may be generated between the different ranges with the aid of a phase modulator. The phase is variably modulated over time in the process, and a frequency offset is generated thereby. Examples of such modulators are those that are based on the modulation of the charge carrier density, or based on electro-optical effects, such as the Pockels effect or the Kerr effect.

According to one further advantageous refinement of the present invention, a separate light source is provided for each frequency range. In this way, it is possible to use different light sources having different characteristics, which increases the flexibility overall.

According to one further advantageous refinement of the present invention, a separate detector is provided for each frequency range. In this way, a particularly reliable detection of the light may be achieved since the detector may be matched to the received light of the particular frequency range.

According to one further advantageous refinement of the present invention, the separating unit includes a notch filter, in particular, in the form of photonic ring oscillators. With the aid of a notch filter, received light having different frequency ramps may be reliably separated into light having one frequency ramp in each case.

Further features and advantages of the present invention may be derived from the figures, and from the associated description of the figures.

It shall be understood that the above-mentioned features and those still to be described hereafter may be used not only in the particular described combination, but also in other combinations, or alone, without departing from the scope of the present invention.

Preferred embodiments and specific embodiments of the present invention are shown in the drawings and are described in greater detail in the following description, identical reference numerals referring to identical or similar or functionally equivalent components or elements.

DETAILED DESCRIPTION OF EXAMPLE EMBODIMENTS

Figure 1:
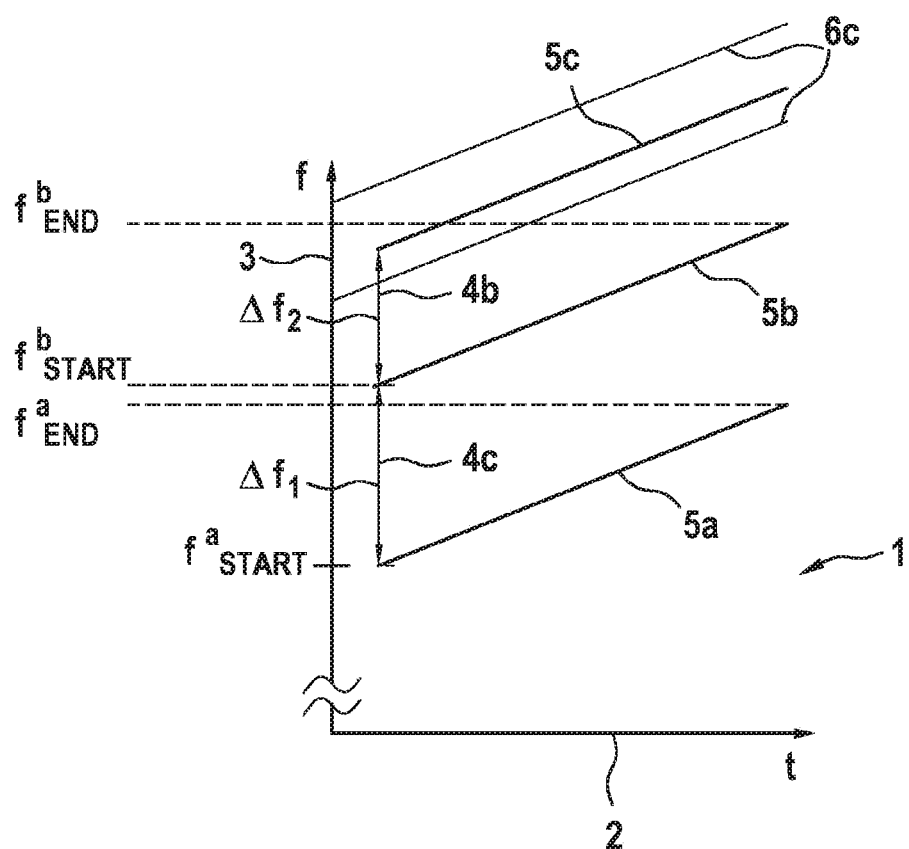
FIG. 1 shows a time-frequency representation of the variation of frequencies over time according to a first specific embodiment of the present invention.

FIG. 1 shows a time-frequency representation of the variation of frequencies over time according to a first exemplary specific embodiment.

FIG. 1 shows a time-frequency representation of frequency ramps, the baseband of the uppermost frequency ramp $6c$ being indicated by dotted lines here. In detail, FIG. 1 shows a time-frequency representation 1, frequency 3 being plotted against time 2. Three frequency ramps $5a$, $5b$ and $5c$ are apparent, which each rise with the same slope in the same time interval. Frequency ramps $5a$, $5b$ differ in their respective starting frequency by frequency difference $4a$, and the two frequency ramps $5b$ and $5c$ differ by frequency difference $4b$. Frequency differences $4a$, $4b$ may be identical or different. Starting frequency $f^a_{START}$ of first ramp $5a$ is the smallest in FIG. 1, and starting frequency $f^c_{START}$ of third frequency ramp $5c$ is the greatest. Due to the linear rise, the respective ending frequency $f^{a,b,c}_{START}$ of the respective frequency ramp $5a$, $5b$, $5c$ is higher than the respective starting frequency $f^{a,b,c}_{START}$. Of course reverse frequency ramps are also possible, for example a linearly dropping frequency ramp. In FIG. 1, three frequency ramps $5a$, $5b$, $5c$ are apparent; however, any other number of frequency ramps is also possible.

The generation of frequency ramps $5a$, $5b$, $5c$ may take place in the following manner: Light from a light source, for example a laser, is generated with the aid of three different phase modulators, and the three linear frequency ramps $5a$, $5b$, $5c$ are thus modulated. The three frequency ramps $5a$, $5b$, $5c$ differ in their starting frequencies $f^a_{START}$, $f^b_{START}=f^a_{START}+\Delta f_1+$, $f^c_{START}=f^a_{START}+\Delta f_1+\Delta f_2$, offset frequencies $4a$, $4b$ between the different starting frequencies $f_{START}$, $f_{START}+\Delta f_1$, $f_{START}+\Delta f_1+\Delta f_2$ not necessarily having to be greater than the frequency deviation, i.e., the difference between the starting and ending frequencies $f^{a,b,c}_{END}-f^{a,b,c}_{START}$ of the respective frequency ramp $5a$, $5b$, $5c$. During the reception, frequency ramps $5a$, $5b$, $5c$ may be mixed in a respective baseband 6, also known as so-called "dechirping." The modulation is removed in the process, and frequency ramps $5a$, $5b$, $5c$ are separated. As long as the respective basebands 6 are spaced far enough apart from one another in terms of the frequency, in particular, when the basebands do not overlap, frequency ramps $5a$, $5b$, $5c$ may also at least partially be in the same frequency range, frequencies of the one frequency range then differing from frequencies of the other frequency range at a particular point in time. FIG. 1 only shows baseband $6c$ of the uppermost frequency ramp $5c$. In general, other forms of the frequency variation are also possible, for example instead of the linear rise of FIG. 1, a linear rise followed by a linear drop.

Figure 2:
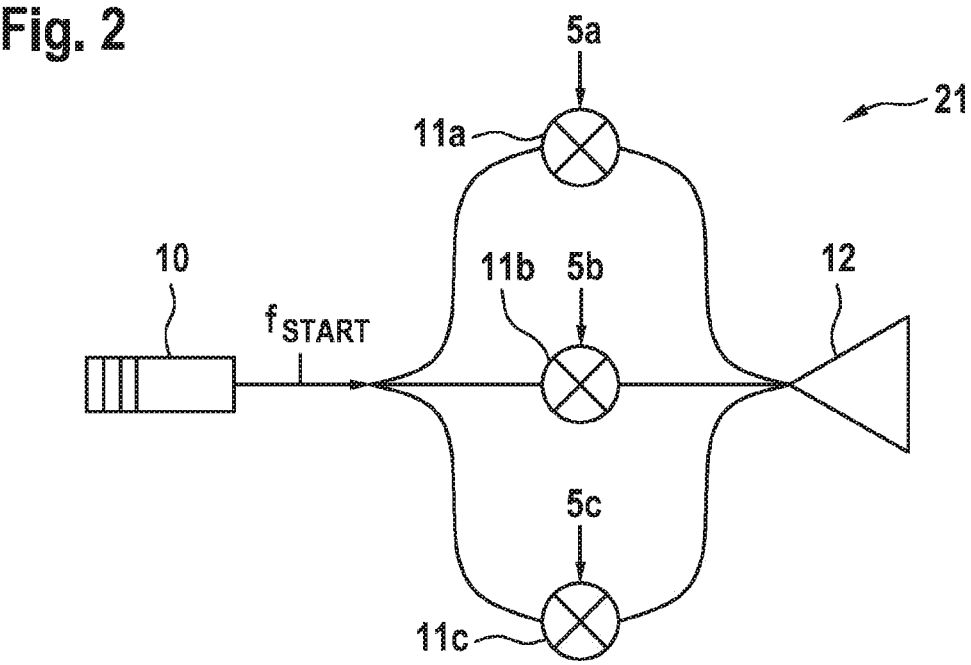
FIG. 2 shows a transmitting device according to a second specific embodiment of the present invention.

FIG. 2 shows a transmitting device according to a second specific embodiment of the present invention.

FIG. 2 shows a transmitting device 21 including three modulators 11 and a light source in the form of a laser 10. Laser 10 emits light with a certain frequency $f_{START}$, which is modulated with the aid of three modulators $11a$, $11b$, $11c$ for generating the linear frequency ramps $5a$, $5b$, $5c$. In other words, one modulator $11a$, $11b$, $11c$ in each case modulates one frequency ramp $11a$, $11b$, $11c$. Thereafter, the light of the three generated frequency ramps $5a$, $5b$, $5c$ is emitted with the aid of transmitting optics 12.

Figure 3:
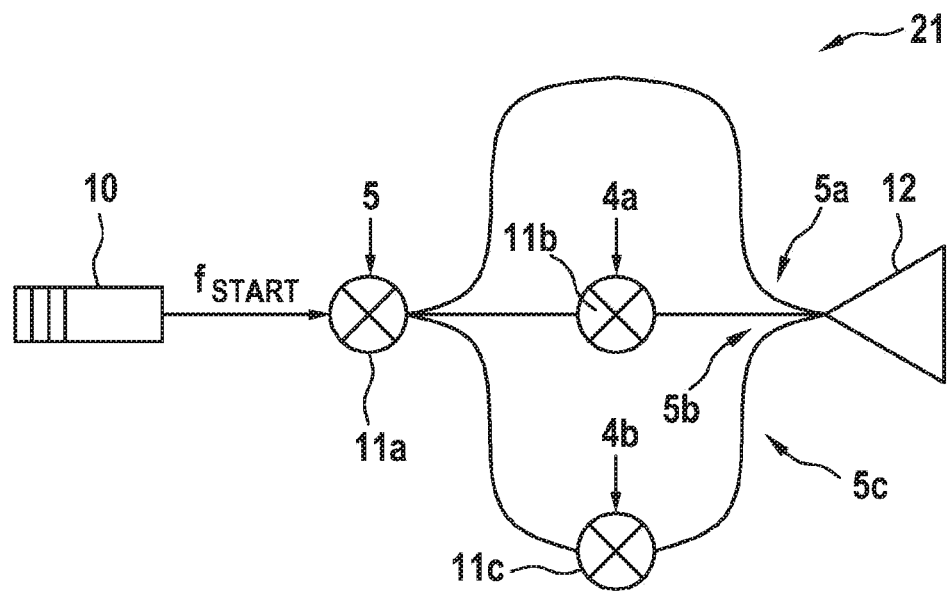
FIG. 3 shows a transmitting device according to a third specific embodiment of the present invention.

FIG. 3 shows a transmitting device according to a third specific embodiment of the present invention.

FIG. 3 shows a transmitting device 21 including a laser 10, a modulator $11a$ for generating frequency ramps, and two modulators $11b$, $11c$ for generating frequency offset $4a$, $4b$. Only one modulator 11 is used here for the generation of frequency ramps $5a$, $5b$, $5c$. The linear frequency ramp for the light of laser 10 generated with the aid of modulator 11 is then divided among three paths $5a$, $5b$, $5c$, it being shifted by a frequency offset $4a$, $4b$ in two of the three paths $5b$, $5c$. This frequency offset $4a$, $4b$ may also be generated with the aid of a phase modulator. The phase is variably modulated over time in the process, and a frequency offset $4a$, $4b$ is generated thereby. Such modulators are based, for example, on the modulation of the charge carrier density or on electro-optical effects, such as the Pockels effect or the Kerr effect.

Figure 4:
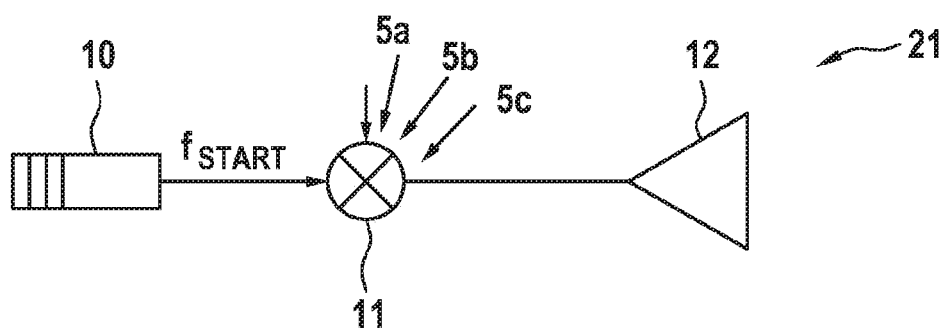
FIG. 4 shows a transmitting device according to a fourth specific embodiment of the present invention.

FIG. 4 shows a transmitting device according to a fourth specific embodiment of the present invention.

FIG. 4 generally shows a transmitting device 21 according to FIG. 2. In contrast to the three modulators 11a, 11b, 11c of FIG. 2, modulator 11 of FIG. 4 has a broadband design, so that it is able to modulate all three frequency ramps 5a, 5b, 5c onto the light of laser 10.

Figure 5:
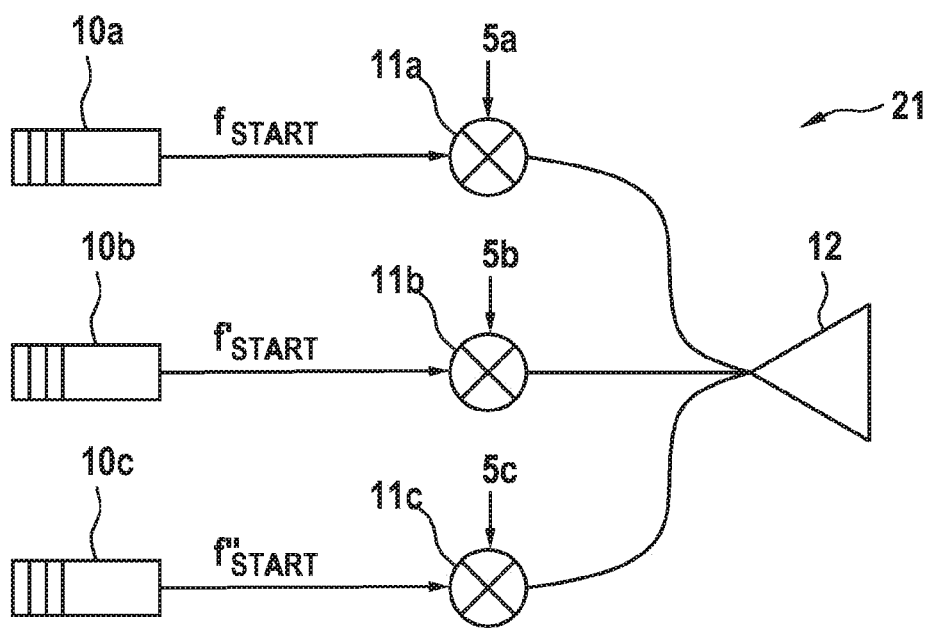
FIG. 5 shows a transmitting device according to a fifth specific embodiment of the present invention.

FIG. 5 shows a transmitting device according to a fifth specific embodiment of the present invention.

FIG. 5 essentially shows a transmitting device 21 according to FIG. 2. In contrast to transmitting device 21 according to FIG. 2, three lasers 10a, 10b, 10c are now situated on transmitting device 21 according to FIG. 5, whose respective light signal having frequency $f_{START}$, $f'_{START}$, $f''_{START}$ is accordingly provided with a frequency ramp 5a, 5b, 5c with the aid of a modulator 11a, 11b, 11c assigned in each case to laser 10a, 10b, 10c. The accordingly modulated light having frequency ramps 5a, 5b, 5c is then irradiated together via transmitting optics 12.

The modulated light signals according to FIGS. 1 through 5 are, as shown, radiated into the space via transmitting optics 12. A dedicated transmitting optics 12 may be provided in each case for the respective modulated light signals, for example in the form of a micromechanical scanner or an optical phase array or the like, which then irradiates in a certain angular range, so that the different angular ranges of other/further transmitting optics do not overlap. As an alternative, transmitting device 21 may be designed in such a way that an irradiation with the aid of a transmitting optics 12 in different angular ranges takes place automatically as a result of the different frequency ranges, in particular, medium wavelengths of the different ramps 5a, 5b, 5c. The respective light of the three modulated laser beams 10a, 10b, 10c of FIG. 5 is thus combined and then emitted via the same transmitting optics 12. The different frequencies of the modulated light result in a desired beam deflection in different spatial angles. Frequency offset 4a, 4b between ramps 5a, 5b, 5c is selected sufficiently large, which is why, in particular, the specific embodiment of FIG. 5 is advantageous for this purpose.

Figure 6:
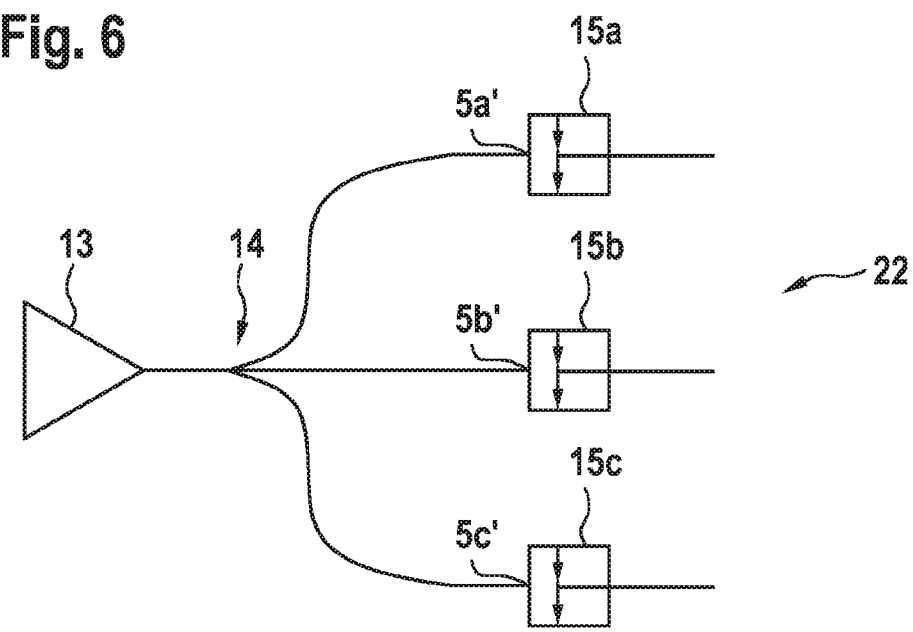
FIG. 6 shows a receiving device according to a sixth specific embodiment of the present invention.

FIG. 6 shows a receiving device according to a sixth specific embodiment of the present invention.

FIG. 6 shows a receiving device 22 including three detectors 15a, 15b, 15c. Light received by receiving optics 13 of receiving device 22 is initially separated with the aid of a separating device 14 prior to striking a detector 15a, 15b, 15c. In other words, prior to the mixing, i.e., prior to the conversion of the optical signal into an electrical signal, the received optical light signal, which includes multiple frequency ramps 5a', 5b', 5c', is separated, for example, using notch filters, in particular, in the form of photonic ring oscillators. Each frequency ramp 5a', 5b', 5c' is then supplied to a respective detector 15a, 15b, 15c. Beforehand, each received frequency ramp 5a', 5b', 5c' is superimposed with the corresponding transmitting ramp 5a, 5b, 5c to ensure a coherent reception: More precisely, after the detection of the light having the corresponding frequency ramp 5a', 5b', 5c' by the corresponding detector 15a, 15b, 15c, the light signal of each frequency ramp 5a', 5b', 5c' thus superimposed is mixed with the corresponding transmitting ramp 5a, 5b, 5c into the respective baseband 6 and may then be evaluated in the conventional manner according to the FMCW principle.

Figure 7:
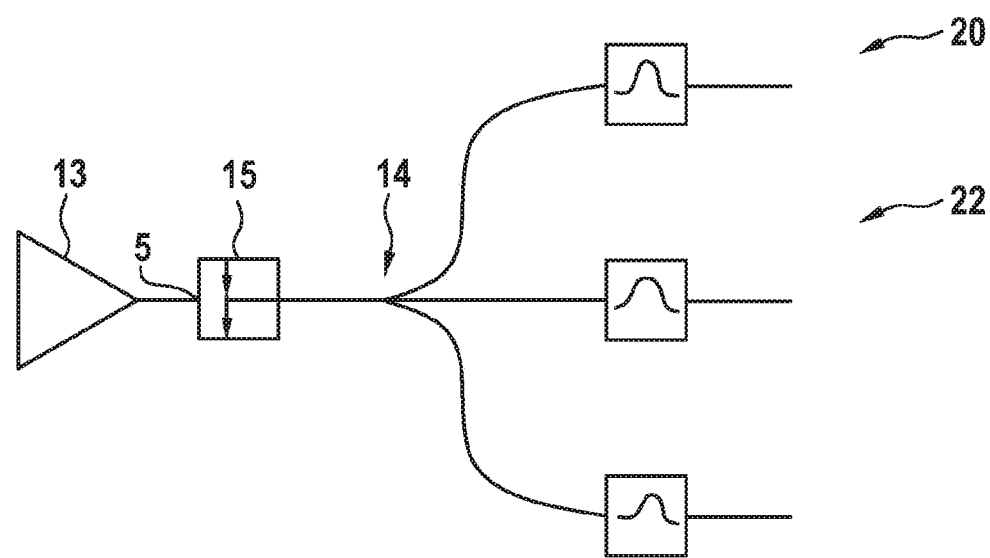
FIG. 7 shows a receiving device according to a seventh specific embodiment of the present invention.

FIG. 7 shows a receiving device according to a seventh specific embodiment of the present invention.

FIG. 7 shows a receiving device 22 including a detector 15. Light received by receiving optics 13 is supplied to detector 15, which includes one or two photodiodes, for example. Light having one of the received frequency ramp 5a', 5b', 5c' is then superimposed with light of the corresponding transmitting ramp 5a, 5b, 5c. Thereafter, either the entire baseband 6, i.e., all basebands 6a, 6b, 6c having frequency ramps 5a', 5b', 5c' of the respective transmitted frequency ramps 5a, 5b, 5c may be scanned, or band pass filters and/or electrical mixers are used in the respective baseband 6 for separating frequency ramps 5a, 5b, 5c. In particular, frequency difference 4a, 4b of frequency ramps 5a, 5b, 5c in relation to the bandwidth of detector 15 is selected accordingly in the process, so that detector 15 is accordingly designed to receive all ramps 5a, 5b, 5c.

Figure 8:
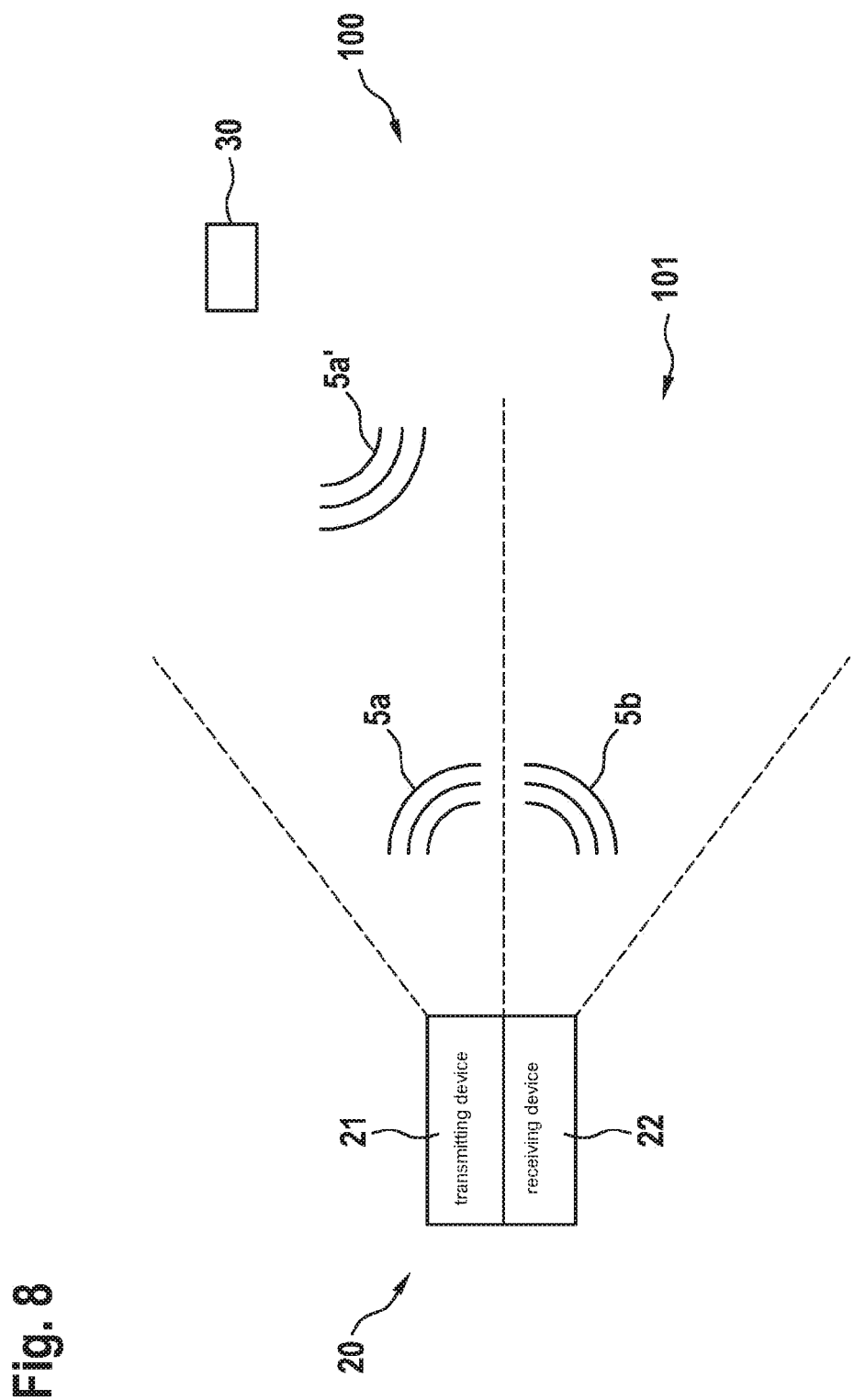
FIG. 8 shows a sensor device according to an eighth specific embodiment of the present invention.

FIG. 8 shows a sensor device according to an eighth specific embodiment of the present invention.

FIG. 8 shows a sensor device 20 in the form of a LIDAR system. Sensor device 20 includes a transmitting device 21 in the specific embodiment of FIG. 1, and a receiving device in the specific embodiment of FIG. 7. Transmitting device 21 emits light having different frequency ramps 5a, 5b in different angular ranges 100, 101. An object 30 which is situated in angular range 100 within range of the sensor device reflects the emitted light having frequency ramp 5a. The light having frequency ramp 5a' emitted by object 30 is then received by receiving device 22. Sensor device 20 then evaluates the received light and is able to determine the distance of object 30 from sensor device 20.

In summary, at least one of the specific embodiments of the present invention has at least one of the following advantages:
  simultaneous emission in different angular ranges and reception of the reflected light using only one receiving unit;
  simultaneous irradiation of multiple angular ranges;
  increased measuring time per ramp and, as a result, improvement of the signal-to-noise ratio;
  greater range;
  parallelization of the LIDAR system possible;
  higher reliability due to fewer detection errors as a result of multiple reflections;
  simple design; and
  easy execution.

Although the present invention has been described based on preferred exemplary embodiments, it is not limited thereto, but is modifiable in a variety of ways.

What is claimed is:

1. A transmitting device for emitting light having at least one frequency, the transmitting device being configured to emit light simultaneously in different angular ranges in such a way that a frequency of the light in a particular angular range is time-dependently varied in a respective frequency range, frequencies in the different frequency ranges not overlapping for different angular ranges at different times;
  wherein the transmitting device is configured to emit the light in the different angular ranges simultaneously as a plurality of simultaneous non-overlapping frequency ramps, the frequency ramps each linearly increasing in frequency over time in the particular angular range or linearly decreasing in frequency over time in the particular angular range.

2. The transmitting device as recited in claim 1, wherein the transmitting device is configured to linearly vary the frequency of the frequency ramp in the particular angular range over time to increase the frequency from a starting frequency to an ending frequency.

3. The transmitting device as recited in claim 1, wherein the transmitting device includes a light source and a modulation unit configured to generate the variation of frequencies of the light of the light source dependent on time.

4. The transmitting device as recited in claim 3, wherein the modulation unit includes one modulator for each different frequency range of the frequency.

5. The transmitting device as recited in claim 3, wherein the modulation unit includes a modulator configured to vary a frequency range over time, and at least one further modulator configured to generate the different frequency ranges.

6. The transmitting device as recited in claim 1, wherein the transmitting device includes a separate light source for each frequency range of the light.

7. The transmitting device as recited in claim 1, wherein the simultaneous non-overlapping frequency ramps have the same slope.

8. A receiving device for receiving light emitted using a transmitting device, comprising:
   receiving optics configured to receive a light emitted using the transmitting device;
   a separating unit configured to separate frequencies of different frequency ranges varying over time, of the received light; and
   at least one detector configured to convert the received light into electrical signals;
   wherein the transmitting device emits light simultaneously in different angular ranges in such a way that a frequency of the light in a particular angular range is time-dependently varied in a respective frequency range, frequencies in the different frequency ranges not overlapping for different angular ranges at different times;
   wherein the transmitting device is configured to emit the light in the different angular ranges simultaneously as a plurality of simultaneous non-overlapping frequency ramps, the frequency ramps each linearly increasing in frequency over time in the particular angular range or linearly decreasing in frequency over time in the particular angular range.

9. The receiving device as recited in claim 8, wherein the at least one detector includes a separate detector for each of the different frequency ranges.

10. The receiving device as recited in claim 8, wherein the separating unit includes a notch filter.

11. The receiving device as recited in claim 10, wherein the notch filter is in the form of photonic ring oscillators.

12. The receiving device as recited in claim 8, wherein the simultaneous non-overlapping frequency ramps have the same slope.

13. A sensor device, comprising:
   a transmitting device for emitting light having at least one frequency, the transmitting device being configured to emit light simultaneously in different angular ranges in such a way that the frequency of the light in a particular angular range is time-dependently varied in a respective frequency range, frequencies in the different frequency not overlapping for different angular ranges at different times;
   wherein the transmitting device is configured to emit the light in the different angular ranges simultaneously as a plurality of simultaneous non-overlapping frequency ramps, the frequency ramps each linearly increasing in frequency over time in the particular angular range or linearly decreasing in frequency over time in the particular angular range; and
   a receiving device for receiving light emitted using the transmitting device, the receiving device including:
      a separating unit configured to separate frequencies of different frequency ranges varying over time; and
      at least one detector configured to convert the received light into electrical signals.

14. A method for emitting light having at least one frequency, the method comprising:
   emitting the light simultaneously in different angular ranges in such a way that a frequency of the light in a particular angular range is time-dependently varied in a respective frequency range, frequencies in different frequency ranges not overlapping for different angular ranges at different times;
   wherein the light is emitted in the different angular ranges simultaneously as a plurality of simultaneous non-overlapping frequency ramps, the frequency ramps each linearly increasing in frequency over time in the particular angular range or linearly decreasing in frequency over time in the particular angular range.

15. A method for receiving light having different frequency ranges, the method comprising:
   receiving light emitted using the transmitting device;
   separating frequencies of different frequency ranges, of the received light, the frequencies varying over time; and
   converting the received light converted into electrical signals;
   wherein the light is emitted by:
      emitting the light simultaneously in different angular ranges in such a way that a frequency of the light in a particular angular range is time-dependently varied in a respective frequency range, frequencies in different frequency ranges not overlapping for different angular ranges at different times;
      wherein the light is emitted in the different angular ranges simultaneously as a plurality of simultaneous non-overlapping frequency ramps, the frequency ramps each linearly increasing in frequency over time in the particular angular range or linearly decreasing in frequency over time in the particular angular range.

* * * * *